April 20, 1965

L. JULIE 3,179,880

IMPEDANCE MEASURING APPARATUS

Filed May 18, 1962

INVENTOR
LOEBE JULIE
BY
ATTORNEY

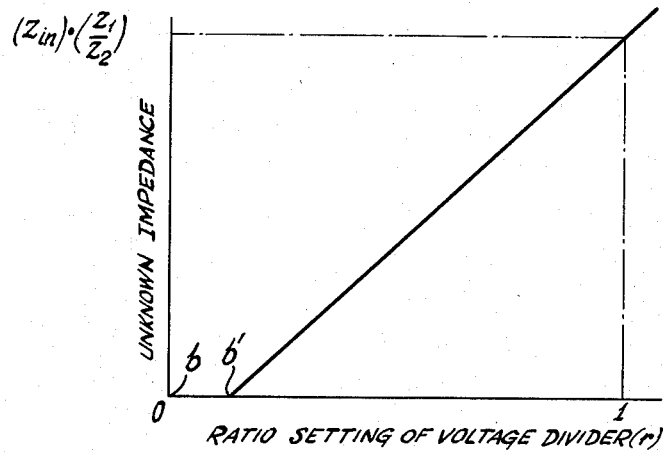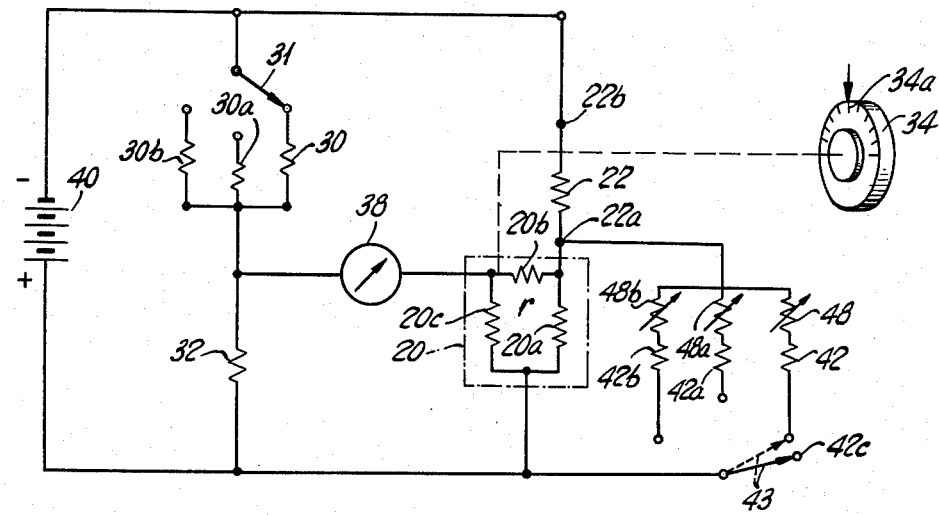

April 20, 1965 L. JULIE 3,179,880
IMPEDANCE MEASURING APPARATUS
Filed May 18, 1962 4 Sheets-Sheet 3

INVENTOR
LOEBE JULIE
BY
ATTORNEY

United States Patent Office 3,179,880
Patented Apr. 20, 1965

3,179,880
IMPEDANCE MEASURING APPARATUS
Loebe Julie, New York, N.Y., assignor to Julie Research Laboratories, Inc., New York, N.Y., a corporation of New York
Filed May 18, 1962, Ser. No. 195,680
27 Claims. (Cl. 324—57)

This invention relates to an improved electrical bridge circuit useful for measuring impedances to a high degree of accuracy, providing for the use of a linear potentiometer and a linear scale.

Adaptations of the fundamental Wheatstone bridge circuit have long been used to measure resistances by null, or balance, techniques. Thus, in the most familiar arrangement, an unknown resistor $R_x$ is connected in one bridge arm and a calibrated rheostat $R_a$, connected in another arm, is adjusted to balance the circuit with known resistance $R_c$ and $R_d$ in still other arms. Ideally, the resistance of the unknown resistor is linearly related to the resistance of the rheostat when the bridge is balanced, as is seen by the equation $$R_x = R_a \frac{R_c}{R_d}$$

where $R_c/R_d$ is a constant. However, the varying resistance of the rheostat contact limits the accuracy of a bridge of this type.

In another type of resistance measuring circuit, a potentiometer has been used as the variable bridge element. The portions of the potentiometer on each side of its movable contact or tap are in adjacent arms of the bridge, and the tap is connected to one of the cross-bridge elements, i.e., either the power supply or the meter. Thus, when the bridge circuit is balanced, the resistance of the tap has no effect on the meter indication.

Circuits of this type pose a problem, too, as is readily seen by considering a circuit in which the potentiometer resistances on each side of the tap are $R_a$ and $R-R_a$, where R is the resistance of the potentiometer and the unknown impedance is $R_x$. At balance $$\frac{R_x}{S} = \frac{Ra}{R-R_a}$$

where S is the known standard resistor. Since the ratio $$\frac{R_a}{R-R_a}$$

varies from zero to infinity in a non-linear manner, it will be apparent that a scale calibrated in terms of the ratio $$\frac{R_a}{R}$$

must be non-linear if the resistance along the potentiometer is directly related to the position of the tap. This non-linearity compresses the scale at one end, making reading of it inherently less accurate than in the case of a corresponding linear scale. Moreover, it is more difficult to manufacture a non-linear scale than a linear scale having the same accuracy. Nor is it satisfactory to attain a linear scale by means of a non-linear potentiometer resistance characteristic. Accurate non-linear characteristics are considerably more expensive to obtain than linear characteristics.

Other problems encountered in the use of measuring circuits of this type include cumbersome ways of changing scale factors and difficulty of calibration.

The objective of my invention is to provide a highly accurate impedance measuring circuit in which the impedance of movable contacts does not detract from the accuracy of the measurement; in which the impedance to be measured is directly related to distance along a linear indicating scale; in which the scale factor can be changed over a wide range by changing the impedance of only one component; and in which the circuit is readily calibrated.

In accordance with the present invention a circuit is provide having a three terminal voltage divider as one arm. The reading of unknown impedance is a direct linear function of the transfer ratio of the voltage divider, whereby a direct reading of the unknown impedance is obtained by varying the transfer ratio of the divider and the reading is shown on the voltage divider scale. The inventive circuit is not limited by the accuracy of the voltage divider because it is possible to calibrate the circuit to accuracies above those of the divider components by the use of resistance trimmers. Furthermore, the scale is not limited by the impedance limits of the divider since various impedances can be shunted across the proper elements to provided either a higher scale than the voltage divider or to reduce the scale by a proper factor. The inventive circuit also allows easy calibration to a known standard impedance.

I achieve this objective by providing an impedance loop with two elements of known impedance permanently connected in the loop in series. A pair of releasable terminals are provided so that an element with impedance to be measured can be connected in series with the first two elements and a special three terminal voltage divider, as defined subsequently. The impedance loop is completed by connection between the voltage divider and one of the known impedances. The divider has means to vary the ratio of voltage between its output high and common terminals and its input high and common terminals. A voltage source and means responsive to voltage are provided in the circuit with either the source or the responsive means connected to the third terminal (an output terminal) of the voltage divider. A linear scale is provided coupled to the voltage divider.

I have found that, with this circuit, the value of the unknown linear impedance connected in the circuit is a direct linear function of the ratio setting of the voltage divider when the bridge is balanced. Furthermore, by marking the divider with a linear ratio scale described below, the value of the unknown impedance is directly indicated, except for a scale factor.

The basic circuit may be modified to provide range switching, by which a wide spectrum of impedances may be measured without loss of the linear readout characteristic. In one such modification, to lower the scale, an impedance element is connected in parallel with the voltage divider and its value is shifted to change the scale of measurement. In another embodiment, to scale the device higher than the divider, the normal Y configuration at one end of the bridge is converted to an equivalent delta circuit, with scale shifting effected by changing one of the delta resistors.

For a fuller understanding of the nature of the invention, reference should be had to the following detailed description taken in connection with the accompanying drawings, in which:

FIG. 3 is a plot drawn on Cartesian coordinates of the relationship between the unknown impedance and the ratio setting of the voltage divider in the present invention;

FIG. 4 is a schematic representation of a bridge circuit utilizing resistors as impedance elements and embodying the low-scale switching and the calibration adjustment features of my invention;

Figure 1:
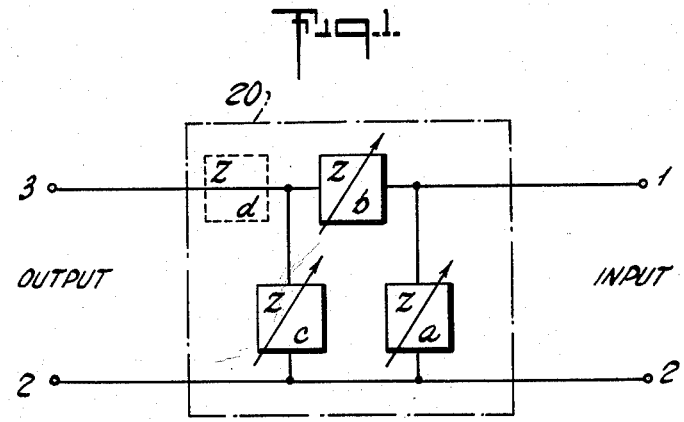
FIG. 1 is a schematic electrical circuit depicting the simplified electrical equivalent circuit (equivalent $\pi$) of the voltage dividers used in the present invention.

FIG. 1 is a simplified equivalent $\pi$ circuit of the voltage dividers used in the present invention. The Kelvin-Varley divider may be reduced to a simplified equivalent $\pi$ circuit shown in FIG. 1. These dividers are chosen so that the input sees a substantially constant impedance $Z_{in}$, which is $$\frac{Z_a[Z_b+Z_c]}{Z_a+Z_b+Z_c}$$

with an open circuit output. One or more adjustments on these dividers determine the three internal impedances, $Z_a$, $Z_b$ and $Z_c$ of the equivalent circuit. These dividers are also chosen so that their transfer ratio "$r$," which is $$\frac{Z_c}{Z_b+Z_c}$$

is linear with respect to the adjustment dials of the divider. Divider output impedance with input shorted $Z_{out}$ is $$Z_d + \frac{Z_c \cdot Z_b}{R_c + Z_c}$$

where $Z_d$ represents the possible effect of switch contact resistance.

Figure 2:
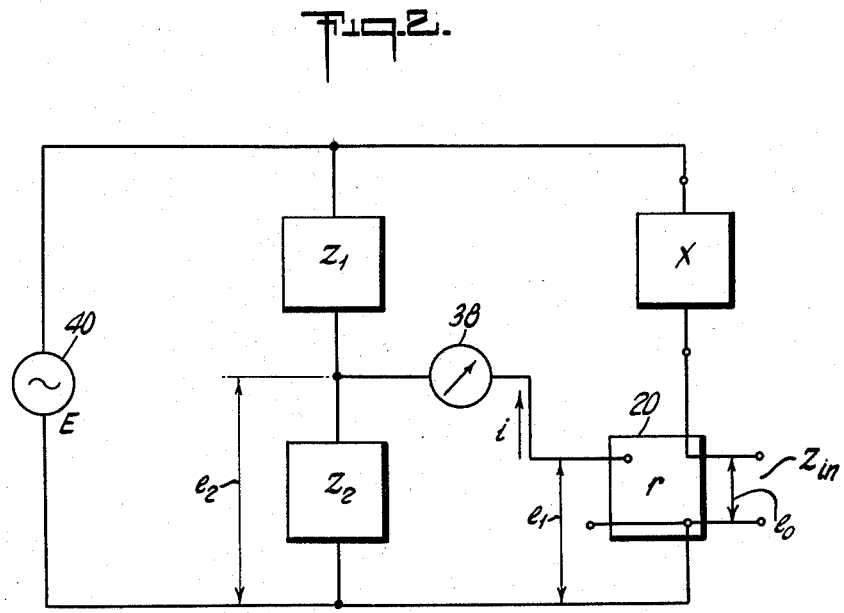
FIG. 2 is a schematic representation of an equivalent electrical circuit depicting one embodiment of the present invention.

FIG. 2, a simplified equivalent circuit of an embodiment of the basic circuit of the invention, is used to prove the direct linear relationship between the unknown impedance X and the transfer ratio $r$, and thereby the direct linear relationship between the impedance X and the adjustment dials of the divider. In FIG. 2, known impedances $Z_1$ and $Z_2$ are connected in series and a voltage source 40 is connected in parallel with them. A voltage divider 20 having transfer ratio $r$ and substantially constant input impedance $Z_{in}$ is connected in series with the unknown impedance X and with the impedances $Z_1$ and $Z_2$. A null detector 38 is connected between the high output terminal 3 of the divider 20 and the junction of impedances $Z_1$ and $Z_2$. The voltage across the elements is labeled "$e$" and the currents through those elements "$i$." In the circuit of FIG. 2, where $Z_{out}$ is the equivalent output impedance of divider 20, the following relationships hold:

$$e_2 = \frac{Z_2}{Z_1+Z_2} \cdot E; \; e_0 = \frac{Z_{in}}{X+Z_{in}} \cdot E; \; e_1 = re_0 - iZ_{out} \quad (1)$$

$$e_1 = r \cdot \frac{Z_{in}}{Z_{in}+X} E - i(Z_{out}) \quad (2)$$

When the null detector 38 indicates zero, $e_1 = e_2$ and $i = 0$ or $$r \cdot \frac{Z_{in}}{X+Z_{in}} \cdot E - i(Z_{out}) = \frac{Z_2}{Z_1+Z_2} \cdot E \quad (3)$$

or $$r \cdot \frac{Z_{in}}{X+Z_{in}} \cdot E = \frac{Z_2}{Z_1+Z_2} \cdot E \quad (4)$$

Solving for X, $$X = rZ_{in}\left(\frac{Z_1+Z_2}{Z_2}\right) - Z_{in} \quad (5)$$

or $$X = Z_{in}\frac{(Z_1+Z_2)}{Z_2}\left[r - \frac{Z_2}{Z_1+Z_2}\right] \quad (6)$$

Note that (6) is independent of ($Z_{out}$).

When $Z_{in}$, $Z_2$ and $Z_1$ are constant, $X = k(r-b)$ where the scale factor K is given by $$\left(\frac{Z_2+Z_1}{Z_2}\right)$$

and the scale is offset by an amount $$b = \frac{Z_2}{Z_1+Z_2}.$$

Referring to FIG. 3, I show a linear scale of divider ratio setting plotted, on $x$–$y$ coordinates, against unknown impedance. The offset (or intercept) $b$ is represented by the distance from 0 to the point $b'$ on the $x$ line. As shown in FIG. 3, when the unknown impedance is 0, the linear scale (ratio setting) is not 0.

Referring to FIG. 4, an embodiment of my bridge circuit using resistances as impedance elements, the divider 20 is connected in series with resistor 22 and switch 43 is in position 42$c$. Although resistance elements are specified by way of example in FIGS. 4–7, it is understood that other impedance elements could be utilized. The resistance of the resistor 22 is to be determined by operation of the bridge. A pair of resistors 30 and 32 complete the bridge. A null detector 38 is connected between the junction of adjustable resistors 20$c$ and 20$b$ of divider 20 and the junction of resistors 30 and 32, while a voltage source 40, either A.C. or D.C., provides the desired bridge excitation. The positions or voltage source 40 and null detector 38 may be interchanged as is usual in measuring bridge circuits.

The series resistor 30 may be switched off by switch 31 and other resistors of higher or lower values, 30$a$ or 30$b$, inserted in its place, depending upon the resistance of the unknown element 22.

To facilitate insertion of an unknown resistor into the circuit as $R_{22}$, suitable terminals 22$a$ and 22$b$ may be provided for snap-in, or other types of readily changed connections.

The resistances of the various resistors are designated by the term "R" followed by a numerical subscript that corresponds with the reference numeral of the particular resistor. Thus, $R_{22}$ is the resistance of the resistor 22 and $R_{20b}$ is the resistance set on adjustable resistor 20$_b$.

In the case of FIG. 4, the bridge equation corresponding to Equation 6, where $$\frac{R_{20a}(R_{20b}+R_{20c})}{R_{20a}+R_{20b}+R_{20c}} = R_{in} = R_{20}$$

is $$R_{22} = X = R_{20}\frac{(R_{30}+R_{32})}{R_{32}}\left[r - \frac{R_{32}}{R_{30}+R_{32}}\right] \quad (7)$$

The divider is designed so that $R_{20} = R_{in}$ is substantially constant.

A scale 34, coupled to the movable connected arms of resistance 20$a$, 20$b$ and 20$c$ is linearly calibrated in terms of the transfer ratio "$r$" of the divider. From Equation 7 it will be seen that, at balance, transfer ratio "$r$" is a direct linear function of the resistance of $R_{22}$. Accordingly, the reading on the scale 34 is linearly related to an unknown resistance connected as $R_{22}$.

In order to reduce the scale factor of the instrument, the resistance $R_{20}$ of the divider 20 can be reduced. However, there is a practical limit to reduction in this manner, since it is very difficult to construct a low resistance potentiometer with the same resolution as a high resistance one.

As a practical alternative, the scaling resistors 42, 42$a$ and 42$b$ are connected in parallel with the divider 20 by means of a switch 43, but may remain unconnected at position 42$c$. In Equation 7 the scale factor is $$R_{20}\frac{(R_{30}+R_{32})}{R_{32}}$$

With scaling resistor 42, the scale factor becomes $$\left(\frac{R_{20}\cdot R_{42}}{R_{20}+R_{42}}\right)\frac{(R_{30}+R_{32})}{R_{32}}$$

where $$R_{20}=\frac{R_{20a}(R_{20b}+R_{20c})}{R_{20a}+R_{20b}+R_{20c}}$$

Figure 5:
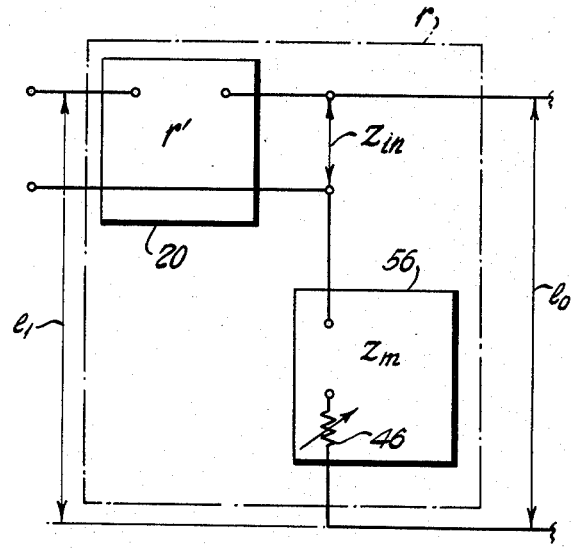
FIG. 5 is a schematic equivalent electrical circuit depicting the matching of an impedance to the divider to produce a zero offset on the divider scale.

As shown in Equations 4 through 7, the ratio setting does not read 0 when the unknown impedance is 0. One way to eliminate the offset is to physically recalibrate the dial 34. Another way to eliminate the offset and utilize its full scale 34 is to add a fixed matching impedance element 56 having impedance $Z_m$ in series with the divider 20 to modify the calibration of the divider, see FIG. 5. The correct value for $Z_m$ is derived as follows in the use of the circuit of FIG. 5:

$$e_1 = r'\frac{Z_{in}}{Z_{in}+Z_m}\cdot e_0 + \frac{Z_m}{Z_{in}+Z_m}e_0 \quad (8)$$

or $r$ the equivalent divider which is the combination of 20 and $Z_m$ as shown in FIG. 5, $$r=\frac{e_1}{e_0}=\frac{Z_m+r'Z_{in}}{Z_m+Z_{in}} \quad (9)$$

To satisfy $$r=\frac{Z_2}{Z_1+Z_2}$$

when $x=0$ and $r'=0$ from Equations 6 and 9, $$r=\frac{Z_2}{Z_1+Z_2}=\frac{Z_m+Z_{in}}{Z_m+Z_{in}} \quad (10)$$

or $$Z_m = \frac{Z_2}{Z_1} Z_{in} \quad (11)$$

Using the circuit of FIG. 5 and a trimmer 46, $Z_m$ may be adjusted to satisfy (11).

In all of the circuits described herein, the scale 34 can be readily standardized at the zero point and also at a middle or full scale point by use of an external standard. When the instrument is thus adjusted, the readings are accurately related to the value of the standard. This calibration permits highly accurate measurements with a relatively inexpensive divider, i.e., one in which the total impedance need not be set with a high degree of accuracy. Also, it facilitates measurement of unknown impedances with reference to an impedance other than that of the divider.

More specifically, referring to FIGS. 4 and 5, a first trimmer resistor 46 is connected in series with impedance $Z_m$ and other trimmer resistors 48, 48a and 48b are in series with the scaling resistors 42, 42a and 42b, respectively. Assume that the unknown resistance is again $R_{22}$. To insure that the divider indication on scale 34 is exactly zero when $R_{22}$ is equal to zero, $R_{22}$ is replaced with a short circuit. Either dial 34 is mechanically zeroed or else the trimmer resistor 46 of FIG. 5 is adjusted until the bridge is balanced with the divider 20 set at zero. A second calibration is then made by replacing the unknown resistor 22 with a precision resistor of known value. The divider 20 is set to indicate on scale 34 the value of the precision resistor and the relevant trimmer resistor 48 is adjusted to balance the bridge. Thus calibrated, the circuit of FIG. 4 indicates the value of an unknown resistor accurately referred to the value of the calibrating resistor.

More generally, calibration of the bridge circuits of the present invention in the manner just described can be achieved with trimmer resistors connected in series or in shunt with the scaling impedance elements or with the impedance elements of the bridge.

Figure 6:
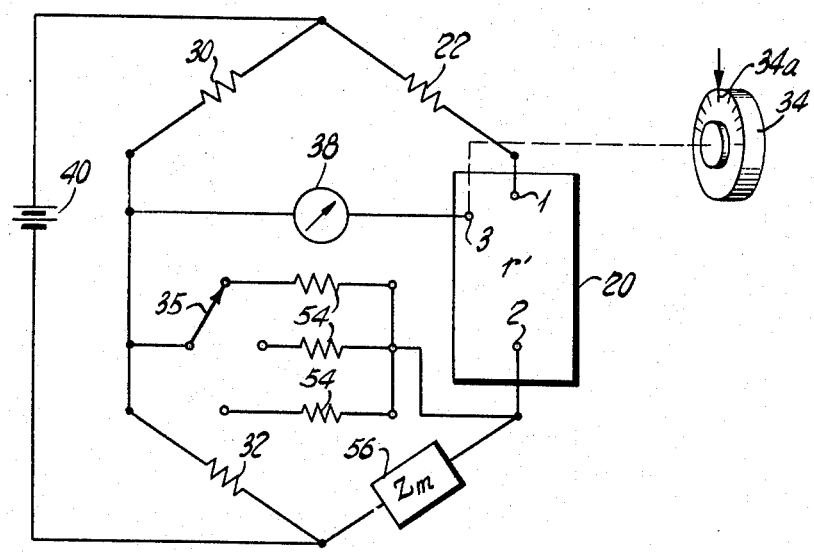
FIG. 6 is a schematic diagram of a delta configuration circuit embodying the high-range scale switching feature of my invention.
Figure 7:
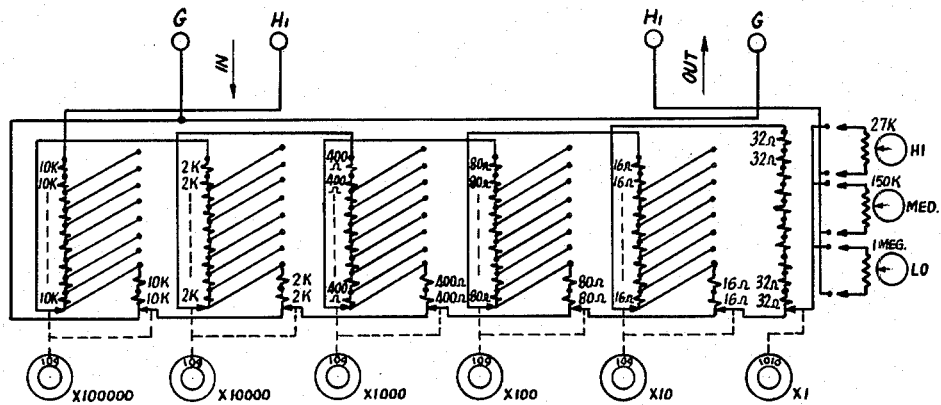
FIG. 7 is a schematic illustration of a six dial Kelvin-Varley voltage divider which may be used as the voltage divider arm of the measuring network in accordance with the invention.

The circuit of FIG. 6 is used for high scaling. In the circuit of FIG. 4 the dial 34 must be recalibrated to 0 when switch 31 changes resistors, because the ratio $$\frac{R_{30}+R_{32}}{R_{32}}$$

changes. The delta configuration of FIG. 6 avoids such recalibration.

In FIG. 6 the resistors 30, 22, 56 and 32 and divider 20 are in series with the null detector 38 and resistors 54 in the cross arms. If $R_{30}R_{56}=R_{20}R_{32}$, so that $$\frac{Z_m}{Z_{in}}=\frac{Z_2}{Z_1}$$

then a zero reading on scale 34 coincides with zero impedance of $R_{22}$ for various values of 54. The scale factor can be varied over a substantial range by adjusting resistor 54 to give high range scale switching.

As an example of the versatility of my circuits in measuring impedance elements other than resistors, consider the measurement of small values of unknown inductance. For a full scale 34 representing 1 henry at a measurement frequency of 60 cycles per second, suitable values of the bridge components are that divider 20 has a resistance of 100,000 ohms, fixed resistors 30 and 32 have a resistance of 100,000 ohms, and a 1 henry inductance is in shunt across the input terminals of the divider. Thus, by merely placing an inductance or capacitance in place of resistor 42 as shown in FIG. 4, the foregoing bridge may be used to measure inductance or capacitance, provided the effective reactance of the coil or capacitor at the measuring frequency is suitably low in comparison to the input impedance $Z_{in}$ of divider 20.

Thus, I have described an improved impedance measuring circuit in which a special three-terminal voltage divider is connected in one arm of a fourarm bridge. The bridge is balanced by adjusting the position of the divider arm, and, at balance, the position of the arm is linearly related to the unknown resistance being measured. With the proper calibration of the dial or by use of a matching impedance, the entire range of divider setting may be utilized, i.e., the zero setting of the divider corresponds to a zero value for the measured resistance.

I have also described a modification of the above bridge circuit in which scaling impedance elements are connected in parallel with the divider to extend the full scale readings below the divider impedance. The full scale readings are extended above the divider impedance by means of a delta configuration as shown. Thus, a single divider having a high input impedance can be used accurately to measure an extremely wide range of impedance elements.

Using a high accuracy divider, resistance measurements to an accuracy of ±0.001 percent have repeatedly been made with my circuits. In fact, even with standard commercial dividers, accuracies up to ±0.005 percent are obtainable. An example of a high accuracy divider is Leeds and Northrup type 4395.

Since by the term "voltage divider" I mean any three-terminal device establishing a transfer ratio between its input and output impedances, my invention contemplates the use of not only dividers utilizing resistances, such as the Kelvin-Varley circuit and an axial potentiometer, but dividers utilizing capacitance and mutual inductance as their impedance elements. Particularly in connection with those measurements where a high divider input impedance is desired, such as in capacitance measurements, a ratio transformer divider may be used as the divider 20 to get a $Z_{in}$ of over 1 megohm. With such high impedance, the scaling element 42 becomes the principal determinant of the input impedance and may be a pure capacitance or inductance.

Of special interest in commercial measurements is the fact that the null indicator in my bridge may be utilized to produce an error signal which, through amplifiers and drive mechanisms, automatically positions the movable arm of the divider to its final position and registers, usually digitally, the extent of such movement. Such digital information is a type of linear scale. Auxiliary systems of this type which may be employed with my bridge circuits are generally known as automatic ratiometers. For example, such systems are manufactured by Nonlinear Systems and Electro-Industries.

In a precision measuring device such as my bridge, it is preferable that the effect of temperature changes on the accuracy of the measurements be taken into account. Compensations for temperature variations may be accomplished in my circuit by making corresponding arms of equal and the same temperature coefficient; for example, in FIG. 6 resistors 22, 32, 30, 54 and impedance element 24 can be made of equal and the same temperature coefficient, either negative or positive, as the divider 20. Alternatively, compensation may be attained by making a shunt arm of the bridge of equal but opposite temperature coefficient; for example, in FIG. 4 the resistors 42a, 42b and 42 can be made of equal but opposite temperature coefficient to divider 20 and resistors 30 and 32 of the same and equal coefficient as divider 20.

Although the bridge has been explained in terms of fixed or switchable impedance elements $R_{30}+R_{32}$, the voltage may also be divided by a fixed or settable voltage divider. For example, in FIG. 4 a voltage divider may replace resistors 30 and 32 with the third terminal of the divider connected to null indicator 38. In such a circuit, with the proper scale settings, a voltage divider having a movable arm for a third terminal may replace the switch 31 and its set of resistors 30, 30a and 30b and resistor 32.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:

1. An impedance-measuring device comrising, in combination:
   an impedance loop including first and second elements of known impedance connected in series,
   means for connecting a third element of unknown impedance in said loop in series with said first and second impedance elements,
   a voltage divider having three terminals and a constant input impedance between its first and second terminals, said voltage divider having its first and second terminals connected between said first and third elements,
   means for varying the relative internal impedance of said divider so that its transfer ratio varies,
   a terminal at the junction between said first and second elements which, together with the third terminal of the voltage divider, comprises a second pair of terminals,
   a third pair of terminals comprising a terminal at the junction of said second and third elements and the terminal of said divider connected to said first element,
   a voltage source connected between one of said second and third pairs of terminals,
   means responsive to the voltage between the other of said second and third pairs of terminals, and
   a linear scale coupled to said voltage divider to indicate the transfer ratio of the voltage divider.

2. An impedance-measuring instrument comprising, in combination:
   a first branch comprising first and second serially connected impedance elements,
   a voltage divider having a substantially constant impedance between first and second fixed terminals thereof and a variable linear transfer ratio and having a third terminal,
   means for connecting an unknown impedance element in series with said voltage divider input impedance for comprising a second branch,
   means for varying the transfer ratio of said divider, said first and second branches being connected in parallel between a second pair of terminals,
   a third pair of terminals comprising said third divider terminal and the junction between said first and second impedance elements,
   a voltage source connected between one of said second and third pairs of terminals,
   means responsive to the voltage between the other of said second and third pairs of terminals, and
   a linear scale coupled to said voltage divider to indicate the transfer ratio of the voltage divider.

3. The instrument defined in claim 2 including means for varying the impedance of one of said first and second impedance elements over a plurality of discrete values.

4. An impedance measuring bridge comprising, means including a plurality of impedance bridge arms for providing an impedance bridge loop, a first of said impedance bridge arms comprising the unknown impedance to be measured by said bridge, voltage divider means having at least three terminals and a variable transfer ratio, the first and second of said terminals defining the input of said voltage divider means and being coupled into said bridge loop for comprising a second of said bridge arms, a third one of said terminals defining the output of said voltage divider means, said voltage divider means having a preset and a substantially constant input impedance during a bridge measurement, means for varying the transfer ratio of said voltage divider means for balancing said bridge, a bridge connection between a junction common with a pair of said bridge arms other than said second bridge arm and said voltage divider means output terminal for comprising one cross-arm of said bridge, the other ends of said pair of bridge arms comprising second and third common junctions of said bridge loop, a second bridge connection between said second and third common junctions of said bridge loop for comprising a second cross-arm of said bridge, a voltage source in one of said bridge cross-arms, and means in the other of said bridge cross-arms for indicating bridge balance, whereby a measurement of said unknown impedance is a function of the voltage divider means transfer ratio at bridge balance.

5. A bridge as defined in claim 4 wherein said second bridge arm further comprising, matching impedance means in series with the input impedance of said voltage divider means, said matching impedance means having an impedance value related to the value of the input impedance of said voltage divider means for causing a zero setting of said transfer ratio varying means to indicate a measurement of zero impedance when the unknown impedance under measurement is an electrical short.

6. A bridge as defined in claim 5, wherein the impadance value of said matching impedance means is a function of the input impedance of said voltage divider means and a ratio of impedances as follows:

$$Z_m = Z_2/Z_1 \cdot Z_{in}$$

where $Z_m$ is the impedance value of said matching impedance means, $Z_m$ is the value of the input impedance of said voltage divider menas, $Z_2$ is the impedance value of the bridge arm having a junction common with said second bridge arm, and $Z_1$ is the impedance value of the bridge arm having a junction common with the unknown impedance under measurement.

7. Apparatus as defined in claim 5 further including, scaling impedance means for changing the range of impedance measurements made by said bridge, said third and fourth arms of said bridge loop comprising impedances of preset values, said scaling impedance means forming a bridge cross-arm connection between the junction common with said series connected voltage divider means and said matching impedance means and the junction common with said third and fourth bridge arms; said scaling impedance means, said matching impedance means and one of said bridge arms forming a delta arrangement of impedances while retaining the zero match provided by said matching impedance means.

8. Apparatus as defined in claim 5, wherein the ratio of the impedance value of said matching impedance means with respect to the input impedance of said voltage divider means is a function of the ratio of the impedance values of said pair of bridge arms.

9. An impedance measuring bridge comprising, means including a plurality of impedance bridge arms for providing an impedance bridge loop, a first of said impedance bridge arms comprising the unknown impedance to be measured by said bridge, voltage divider means having at least three terminals, the first and second of said terminals defining the input of said voltage divider means and being coupled into said bridge loop for comprising a second of said bridge arms, a third one of said terminals defining the output of said voltage divider means, said voltage divider means having a preset and substantially constant input impedance during bridge measurement and also having a variable transfer ratio of linear characteristic, a bridge connection between a junction common with a pair of said bridge arms other than said second bridge arm and said output terminal for comprising a first cross-arm of said bridge, the other ends of said pair of bridge arms comprising second and third common junctions of said bridge loop, a second bridge connection between said second and third common junctions comprising a second cross-arm of said bridge, a voltage source in one of said bridge cross-arms, means in the other bridge cross-arm for indicating bridge balance, and means for varying the transfer ratio of said voltage divider means for balancing said bridge and for indicating an impedance value which is a function of said transfer ratio, whereby a measurement of said unknown impedance is indicated at bridge balance.

10. A bridge as defined in claim 9 further including, impedance means for connection in parallel across the input impedance terminals of said voltage divider means for changing the range of impedance measurements made by said bridge.

11. A bridge as defined in claim 9 wherein the third and fourth bridge arms of said loop comprising, a three terminal voltage divider having first and second terminals thereof connected, respectively, to one end of said first bridge arm and to one end of said second bridge arm, the third terminal of said voltage divider serving as the common junction between said third and fourth bridge arms to which one of said bridge cross-arms is connected.

12. Apparatus as defined in claim 9 wherein said second bridge arm comprising, impedance matching means in series with the input impedance of said voltage divider means, the value of said matching impedance means being related to the value of the input impedance of said voltage divider means for causing said varying and indicating means to indicate a zero setting for a measurement of zero impedance when the unknown impedance under measurement is a short.

13. Apparatus as defined in claim 12, wherein the impedance value of said matching impedance means being characterized as follows: $Z_m = Z_2/Z_1 \cdot Z_{in}$, where $Z_m$ is the impedance value of said matching impedance means, wherein $Z_1$ and $Z_2$ are preset impedance values comprising the third and fourth arms of said bridge loop, and $Z_{in}$ is the input impedance of said voltage divider means.

14. Apparatus as defined in claim 12 further including, scaling impedance means for changing the range of impedance measurements made by said bridge, the third and fourth arms of said bridge comprising impedances of preset values, said scaling impedance means forming a bridge cross-arm connection between the junction common with said series connected voltage divider means and said matching impedance means and the junction common with said third and fourth bridge arms; said scaling impedance means, said matching impedance means and the bridge arm having junctions common with the aforesaid scaling and matching impedance means forming a delta arrangement of impedances for retaining the zero match provided by said matching impedance means.

15. In an impedance measuring bridge having a plurality of arms forming a bridge loop, the combination comprising, impedance means forming first and second bridge arms of said bridge loop, voltage divider means having at least three terminals, the first and second of said terminals defining the input of said voltage divider means and being coupled into said bridge loop for establishing a third bridge arm, a third of said terminals defining the output of said voltage divider means, said voltage divider means having a substantially constant and preset input impedance during bridge measurement and also having a variable transfer ratio of linear characteristic, the fourth arm of said bridge loop comprising an unknown impedance to be measured by said bridge, a common connection between a pair of said bridge arms other than said third bridge arm comprising a first bridge loop junction, the other ends of said pair of bridge arms comprising second and third bridge loop junctions, a connection between one end of said unknown impedance and to either one of said second and third bridge loop junctions, a connection between one input terminal of said voltage divider means and the other of said second and third bridge loop junctions, a bridge connection between the output terminal of said voltage divider means and one of said bridge loop junctions other than a junction common with said third bridge arm comprising a first cross-arm for said bridge, a bridge connection between the other two of said bridge loop junctions comprising a second cross-arm for said bridge, a voltage source in one of said bridge cross-arms, means for indicating bridge balance in the other of said bridge cross-arms, and means for varying the transfer ratio of said voltage divider means for balancing said bridge, whereby bridge balance indicates an impedance measurement of said unknown impedance.

16. A bridge as defined in claim 15 wherein said first and second bridge arms comprising, a three terminal voltage divider having first and second terminals thereof connected, respectively, to said second and third junctions, the third terminal of said voltage divider forming said first junction to which one of said bridge cross-arms is connected.

17. A bridge as defined in claim 15 further including, impedance means for connection in parallel across said third bridge arm for changing the range of impedance measurements made by said bridge.

18. A bridge as defined in claim 15 wherein said third bridge arm comprising, impedance matching means in series with the input impedance of said voltage divider means, said impedance matching means having a preset value related to the input impedance of said voltage divider means for calibrating said varying and indicating means to indicate a measurement of zero impedance when the unknown impedance under measurement is an electrical short, the impedance value of said impedance matching means being characterized as follows: $Z_m = Z_2/Z_1 \cdot Z_{in}$ where $Z_m$ is the impedance value of said impedance matching means, where $Z_1$ and $Z_2$ are known impedances comprising said first and second bridge arms, and $Z_{in}$ is the input impedance of said voltage divider means.

19. A bridge as defined in claim 18 further including, impedance means for connection in parallel across said first and second input terminals of said voltage divider means for changing the range of impedance measurements made by said bridge.

20. A bridge as defined in claim 18 further including, impedance means for connection in parallel across the series connected voltage divider means and impedance matching means for changing the range of impedance measurements made by said bridge.

21. A bridge as defined in claim 18 further including, scaling impedance means for changing the range of impedance measurements made by said bridge, said scaling impedance means forming a bridge cross-arm connection, said last-mentioned cross-arm being a connection between said first junction and the junction common with the series connected voltage divider means and impedance matching means; said scaling impedance means and said impedance matching means in combination with the bridge arm having junctions common with the aforesaid scaling and matching impedance means forming a delta arrangement of impedances while retaining the zero match provided by said impedance matching means.

22. In an impedance measuring system, the combination comprising, means including a plurality of impedance arms for providing an impedance bridge loop, two of said arms having preset known values of impedance and a common connection therebetween for defining a first bridge junction, said arms having terminal ends comprising second and third bridge loop junctions, the third of said impedance bridge arms comprising the unknown impedance to be measured by said bridge, voltage divider means having at least three terminals, the first and second of said terminals defining the input of said voltage divider means and being coupled into said bridge loop for defining a fourth bridge arm, a third of said terminals defining the output of said voltage divider means, said voltage divider means having a substantially constant and preset input impedance during bridge measurement and also having a variable transfer ratio of linear characteristic, a connection between one end of said unknown impedance and to either one of said second and third bridge loop junctions, a connection between one input terminal of said voltage divider means and the other of said second and third bridge loop junctions, a connection between the second input terminal of said voltage divider means and the other end of said unknown impedance comprising a fourth bridge loop junction, a bridge connection between the output terminal of said voltage divider means and one of said bridge loop junctions other than a bridge loop junction common with said fourth bridge arm for defining a first cross-arm for said bridge, a bridge connection between a pair of said bridge loop junctions other than said one bridge loop junction for comprising a second cross-arm for said bridge, a voltage source in one of said bridge cross-arms, means in the other of said bridge cross-arms for indicating bridge balance, and means for varying the transfer ratio of said voltage divider means for balancing said bridge and for indicating an impedance value which is a function of said transfer ratio, the value of said unknown impedance is a function of the transfer ratio at bridge balance.

23. Apparatus as defined in claim 22, wherein said voltage divider means comprising, a voltage divider and impedance matching means in series with the input impedance of said voltage divider, the value of said matching impedance means being related to the value of the input impedance of said voltage divider for causing said varying and indicating means to indicate a zero setting for a measurement of zero impedance when the unknown impedance under measurement is a short.

24. A system as defined in claim 22, wherein said fourth bridge arm further comprising, matching impedance means in series with the input impedance of said voltage divider means, said matching impedance means having an impedance value related to the value of the input impedance of said voltage divider means for causing a zero setting of said transfer ratio varying means to indicate a measurement of zero impedance when the unknown impedance under measurement is an electrical short.

25. A system as defined in claim 24, wherein the ratio of the impedance value of said matching impedance means to the input impedance of said voltage divider means is a function of the ratio of the impedance values of said two bridge arms of preset values.

26. Apparatus as defined in claim 24 further including, scaling impedance means for changing the range of impedance measurements made by said bridge, said scaling impedance means comprising a bridge cross-arm connection between the junction common with said series connected voltage divider means and said matching impedance means and said first common junction, said scaling impedance means and said matching impedance means in combination with one of said preset value bridge arms forming a delta arrangement of impedances while retaining the zero setting match provided by said matching impedance means.

27. In an impedance measuring system, the combination comprising, means including a plurality of impedance arms for providing an impedance bridge loop, two of said arms having preset known values of impedance, the third of said impedance bridge arms comprising the unknown impedance to be measured by said bridge, voltage divider means having at least three terminals, the first and second of said terminals defining the input of said voltage divider means and being coupled into said bridge loop for defining a fourth bridge arm, a third of said terminals defining the output of said voltage divider means, said voltage divider means having a substantially constant and preset input impedance during bridge measurement and also having a variable transfer ratio of linear characteristic, a common connection between a pair of said bridge arms other than said fourth bridge arm for comprising a first bridge junction, said pair of arms having terminal ends comprising second and third bridge junctions, a bridge connection between the output terminal of said voltage divider means and one of said bridge loop junction other than a junction common with said fourth bridge loop arm comprising a first cross-arm for said bridge, a bridge connection between a pair of said bridge loop junctions other than said one bridge loop junction comprising a second cross-arm for said bridge, a voltage source in one of said bridge cross-arms, means in the other of said bridge cross-arms for indicating bridge balance, and means for varying the transfer ratio of said voltage divider means for balancing said bridge, whereby bridge balance indicates an impedance measurement of said unknown impedance.

References Cited by the Examiner

FOREIGN PATENTS 735,916 8/55 Great Britain.
857,382 9/40 France.
939,345 11/48 France.

WALTER L. CARLSON, *Primary Examiner.*